United States Patent
Fu et al.

(10) Patent No.: US 11,694,385 B2
(45) Date of Patent: Jul. 4, 2023

(54) 3D MICROGEOMETRY AND REFLECTANCE MODELING

(71) Applicants: SONY GROUP CORPORATION, Tokyo (JP); Sony Corporation of America, New York, NY (US)

(72) Inventors: Chen Fu, San Jose, CA (US); Mohammad Gharavi-Alkhansari, San Jose, CA (US)

(73) Assignees: SONY GROUP CORPORATION, Tokyo (JP); SONY CORPORATION OF AMERICA, New York, NY (US)

(*) Notice: Subject to any disclaimer, the term of this patent is extended or adjusted under 35 U.S.C. 154(b) by 61 days.

(21) Appl. No.: 17/342,058

(22) Filed: Jun. 8, 2021

(65) Prior Publication Data
US 2022/0392141 A1 Dec. 8, 2022

(51) Int. Cl.
*G06T 15/04* (2011.01)
*G06T 3/00* (2006.01)
(Continued)

(52) U.S. Cl.
CPC ............ *G06T 15/04* (2013.01); *G06T 3/0006* (2013.01); *G06T 15/506* (2013.01); *G06T 17/205* (2013.01)

(58) Field of Classification Search
CPC ..... G06T 15/04; G06T 3/0006; G06T 15/506; G06T 17/205
See application file for complete search history.

(56) References Cited

U.S. PATENT DOCUMENTS

| 4,144,556 A * | 3/1979 | Bond | G03B 15/02 |
|---|---|---|---|
| | | | 362/350 |
| 6,907,138 B1 * | 6/2005 | Hoffman | G01N 21/8806 |
| | | | 382/312 |

(Continued)

FOREIGN PATENT DOCUMENTS

CN 110428491 A 11/2019

OTHER PUBLICATIONS

Yamaguchi, et al., "High-fidelity facial reflectance and geometry inference from an unconstrained image", ACM Transactions on Graphics, vol. 37, No. 4, Jul. 2018, 02 pages.
(Continued)

*Primary Examiner* — Phuc N Doan
(74) *Attorney, Agent, or Firm* — Chip Law Group

(57) ABSTRACT

A system and method for three-dimensional (3D) microgeometry and reflectance modeling is provided. The system receives images comprising a first set of images of a face and a second set of images of the face. The faces in the first set of images and the second set of images are exposed to omni-directional lighting and directional lighting, respectively. The system generates a 3D face mesh based on the received images and executes a set of skin-reflectance modeling operations by using the generated 3D face mesh and the second set of images, to estimate a set of texture maps for the face. Based on the estimated set of texture maps, the system texturizes the generated 3D face mesh. The texturization includes an operation in which texture information, including microgeometry skin details and skin reflectance details, of the estimated set of texture maps is mapped onto the generated 3D face mesh.

15 Claims, 10 Drawing Sheets

(51) Int. Cl.
   *G06T 15/50* (2011.01)
   *G06T 17/20* (2006.01)

(56) References Cited

U.S. PATENT DOCUMENTS

| | | | |
|---|---|---|---|
| 9,123,116 B2 | 9/2015 | Debevec et al. | |
| 10,021,315 B1* | 7/2018 | Colburn | H04N 5/2256 |
| 10,217,286 B1* | 2/2019 | Angel | G06F 3/013 |
| 10,469,831 B2 | 11/2019 | Debevec et al. | |
| 2006/0192785 A1* | 8/2006 | Marschner | G06T 13/40 |
| | | | 345/473 |
| 2009/0226049 A1* | 9/2009 | Debevec | G06T 15/50 |
| | | | 382/118 |
| 2011/0102550 A1* | 5/2011 | Daniel | G06T 7/55 |
| | | | 348/46 |
| 2012/0268571 A1 | 10/2012 | Debevec | |
| 2014/0293091 A1* | 10/2014 | Rhoads | G01J 3/51 |
| | | | 348/234 |
| 2015/0029192 A1 | 1/2015 | Free | |
| 2016/0261850 A1* | 9/2016 | Debevec | G06V 40/16 |
| 2018/0322647 A1* | 11/2018 | Harrington | G06T 7/586 |
| 2018/0336720 A1* | 11/2018 | Larkins | G06T 7/33 |
| 2020/0082572 A1* | 3/2020 | Beeler | G06T 15/506 |
| 2020/0365114 A1* | 11/2020 | Rhodes, Jr. | G09G 5/026 |
| 2021/0295592 A1* | 9/2021 | von Cramon | G06N 3/08 |

OTHER PUBLICATIONS

Gotardo Paulo Paulo Gotardo@DisneyResearch Com et al: "Practical dynamic facial appearance modeling and acquisition", ACM Transactions on Graphics, ACM, NY, US, vol. 37, No. 6, Dec. 4, 2018 (Dec. 4, 2018), pp. 1-13, XP058686902,ISSN: 0730-0301, DOI: 10.1145/3272127.3275073.

* cited by examiner

3D MICROGEOMETRY AND REFLECTANCE MODELING

CROSS-REFERENCE TO RELATED APPLICATIONS/INCORPORATION BY REFERENCE

None.

FIELD

Various embodiments of the disclosure relate to three-dimensional (3D) modeling. More specifically, various embodiments of the disclosure relate to a system and method of 3D microgeometry and reflectance modeling.

BACKGROUND

Advancements in the field of computer graphics have led to development of various techniques of estimation of 3D shape and texture of human faces for photorealistic 3D face modeling. High fidelity 3D models may be in demand in a number of industries, such as entertainment industry, gaming industry, design industry, and healthcare industry. For example, in entertainment and gaming industry, 3D face modeling may be utilized to create a photorealistic face animation or to develop a 3D face of a game character. Conventional imaging setup used for 3D modeling may have inconsistent lighting conditions. As a result, a 3D model constructed based on images acquired by the conventional imaging setup may have inaccuracies associated with the 3D shape of the 3D model. Additionally, the 3D model may include poor surface-level details in term of surface geometry and surface reflection.

Limitations and disadvantages of conventional and traditional approaches will become apparent to one of skill in the art, through comparison of described systems with some aspects of the present disclosure, as set forth in the remainder of the present application and with reference to the drawings.

SUMMARY

A system and a method of three-dimensional (3D) microgeometry and reflectance modeling is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
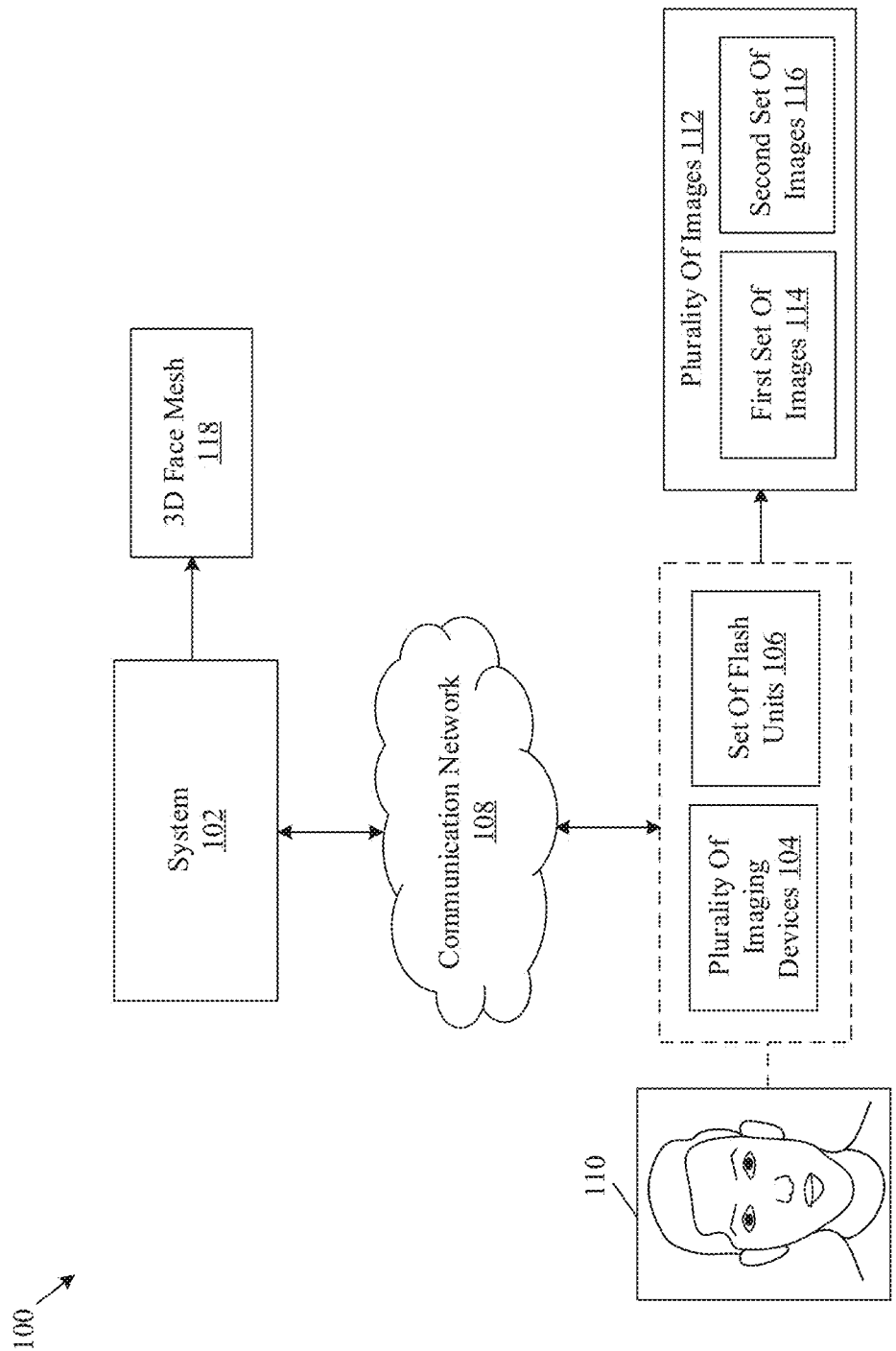
FIG. 1 is a block diagram that illustrates an exemplary network environment for three-dimensional (3D) microgeometry and reflectance modeling, in accordance with an embodiment of the disclosure.

The following described implementations may be found in the disclosed system and method for three-dimensional (3D) microgeometry and reflectance modeling. Exemplary aspects of the disclosure provide a system and method that may be configured to receive a plurality of images. The plurality of images may include a first set of images of a face and a second set of images of the face. In accordance with an embodiment, the system may control a plurality of imaging devices to capture the plurality of images of the face of the human subject from a plurality of viewpoints. In some embodiments, the system may activate a set of flash units concurrently while the plurality of imaging devices captures the first set of images. The face in the first set of images may be exposed to omni-directional lighting. The system may further activate the set of flash units in a sequential pattern while the plurality of imaging devices captures the second set of images. The face in the second set of images may be exposed to directional lighting.

Based on the received plurality of images, the system may be configured to generate a 3D face mesh. The system may execute, by using the generated 3D face mesh and the second set of images, a set of skin-reflectance modeling operations to estimate a set of texture maps for the face. In accordance with an embodiment, the set of skin-reflectance modeling operations may include a diffused reflection modeling operation, a specular separation operation, and a specular reflection modeling operation. In some embodiments, the system may execute the diffused reflection modeling operation (for example, based on Lambertian light model) to generate a diffuse normal map of the face and a diffuse albedo map of the face of the human subject. The diffuse albedo map may be a first texture map of the estimated set of texture maps. In one or more embodiments, the system may execute the specular separation operation to separate specular reflection information from the second set of images, based on the generated diffuse normal map and the generated diffuse albedo map. In some embodiments, the system may execute the specular reflection modeling operation (for example, based on Blinn-Phong light model) to generate a specular albedo map of the face, a specular normal map of the face, and a roughness map of the face. The specular albedo map, the specular normal map, and the roughness map may be referred to as second texture maps of the estimated set of texture maps. The system may texturize the generated 3D face mesh based on the estimated set of texture maps (such as the first texture map and the second texture maps). The texturization may include a mapping of texture information, including microgeometry skin details and skin reflectance details in the estimated set of texture maps, onto the generated 3D face mesh.

In some conventional methods, images of the face may be acquired only in the omni-directional lighting. Therefore, such images may lack adequate information required to generate accurate texture maps for generation of high fidelity 3D models. However, the system of the present disclosure may control the plurality of imaging devices and may activate the set of flash units to capture the images under both omni-directional lighting and directional lighting. While images under omni-directional lighting may be used to estimate accurate 3D shape of the face, images under directional lighting may be used to estimate texture maps which include both microgeometry skin details (such as pore-level details, ridges, and furrows) and the skin reflectance details (such as specular albedo and roughness). The system may make use of both the accurate 3D shape and texture maps to generate a high fidelity and photorealistic 3D model of the face.

FIG. 1 is a block diagram that illustrates an exemplary network environment for three-dimensional (3D) microgeometry and reflectance modeling, in accordance with an embodiment of the disclosure. With reference to FIG. 1, there is shown a network environment 100. The network environment 100 may include a system 102, a plurality of imaging devices 104, a set of flash units 106, and a communication network 108. The system 102, the plurality of imaging devices 104, and the set of flash units 106 may be configured to communicate with each other via the communication network 108. In the network environment 100, there is shown a face 110 of a person, for example. The plurality of imaging devices 104 may acquire a plurality of images 112, which includes a first set of images 114 and a second set of images 116 of the face 110.

The system 102 may include suitable logic, circuitry, and interfaces that may be configured to receive the plurality of images 112 (such as the first set of images 114 and the second set of images 116) associated with the face 110 of a person. The system 102 may be further configured to generate a 3D face mesh 118 based on the received plurality of images 112 and execute a set of skin-reflectance modeling operations to generate texture maps for texturization of the generated 3D face mesh 118. The texturization may generate microgeometry skin details and skin reflectance details on the 3D face mesh 118. Examples of the system 102 may include, but are not limited to, a mainframe machine, a server, a computer work-station, a gaming device (such as a game console), a head-mounted display (such as an eXtended Reality (XR) headset), a wearable display device, a consumer electronic (CE) device, or a mobile computer.

The plurality of imaging devices 104 may include suitable logic, circuitry, and interfaces that may be configured to capture the plurality of images 112 of the face 110 of a person from a corresponding plurality of viewpoints. The plurality of imaging devices 104 may be further configured to transmit the captured plurality of images 112 to the system 102. Examples of an imaging device may include, but are not limited to, an image sensor, a wide-angle camera, an action camera, a camcorder, a digital camera (such as a digital single reflex camera (DSLR) or a digital single lens mirrorless (DSLM)), a camera phone, and/or any image capture device with capability to capture images in multiple formats and at different framerates.

The set of flash units 106 may be configured to produce a flash of light based on trigger signals produced by the system 102. The flash of light may be produced to illuminate the face 110 of the person. Examples of the set of flash units 106 may include, but are not limited to, a built-in and pop up camera flash unit, a dedicated camera flash unit, a macro ring light camera flash unit, and a hammerhead camera flash unit.

It should be noted that the present disclosure is not be limited to the implementation of the plurality of imaging devices 104 and the set of flash units as devices separate from the system 102. Accordingly, in some embodiments, the plurality of imaging devices 104 and the set of flash units may be included in the system 102, without departing from the scope of the present disclosure.

The communication network 108 may include a communication medium through which the system 102, the plurality of imaging devices 104, and the set of flash units 106 may communicate with each other. The communication network 108 may be one of a wired connection or a wireless connection. Examples of the communication network 108 may include, but are not limited to, the Internet, a cloud network, a Cellular or Wireless Mobile Network (such as Long-Term Evolution and 5G New Radio), a Wireless Fidelity (Wi-Fi) network, a Personal Area Network (PAN), a Local Area Network (LAN), or a Metropolitan Area Network (MAN). Various devices in the network environment 100 may be configured to connect to the communication network 108 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the system 102 may be configured to control the plurality of imaging devices 104 to capture the plurality of images 112 from a corresponding plurality of viewpoints. The plurality of imaging devices 104 may be arranged at a corresponding first plurality of locations on a 3D structure. For example, the 3D structure may be a dome shaped cage structure that may offer enough space to accommodate at least one person. The set of flash units 106 may be arranged at a corresponding set plurality of locations on the 3D structure. Each imaging device and each flash unit may be arranged on the 3D structure so as to surround the person inside the space within the 3D structure from a plurality of viewpoints. An example of such arrangement is provided in FIG. 3.

The set of flash units 106 may be activated within a duration in which the plurality of imaging devices 104 captures the plurality of images 112 of the face 110. By way of example, and not limitation, the set of flash units 106 may be activated for two camera shots within a defined duration (~1.5 seconds). In the first shot, while the plurality of imaging devices 104 may capture the first set of images 114, the set of flash units 106 may be activated concurrently to expose the face 110 to omni-directional lighting. In the second shot, while the plurality of imaging devices 104 may capture the second set of images 116, the set of flash units 106 may be activated in a sequential pattern to expose the face 110 to directional lighting. Details of the capture of the plurality of images 112 are further provided for example, in FIG. 3.

At any time-instant, the system 102 may be configured to receive the plurality of images 112 (that may include the first set of images 114 and the second set of images 116) from the plurality of imaging devices 104. In an embodiment, the system 102 may receive the plurality of images 112 from a server which maintains a repository of images from various sources. The face 110 in the first set of images 114 may be exposed to omni-directional lighting and the face 110 in the second set of images 116 may be exposed to directional lighting.

In accordance with an embodiment, the system 102 may be further configured to generate a first 3D face mesh based on the received first set of images 114. The first 3D face mesh may be a raw 3D scan of the face 110 and may include artifacts, such as spikes or pointy edges, large and small holes, and other shape irregularities. The system 102 may be configured to apply a set of model clean-up operations on the generated first 3D face mesh to obtain a refined first 3D face mesh. By way of example, and not limitation, such model clean-up operations may be applied to remove the artifacts from the first 3D face mesh. The system 102 may further generate a second 3D face mesh based on the received second set of images 116. For 3D reconstruction of a 3D face mesh from 2D images, there are many techniques which may be known to one ordinarily skilled in the art. For example, both the first 3D face mesh and the second 3D face mesh may be generated using a photogrammetry-based method (such as structure from motion (SfM)), a method which requires stereoscopic images, or a method which requires monocular cues (such as shape from shading (SfS), photometric stereo, or shape from texture (SfT)). Details of such techniques have been omitted from the disclosure for the sake of brevity.

Figure 5A:
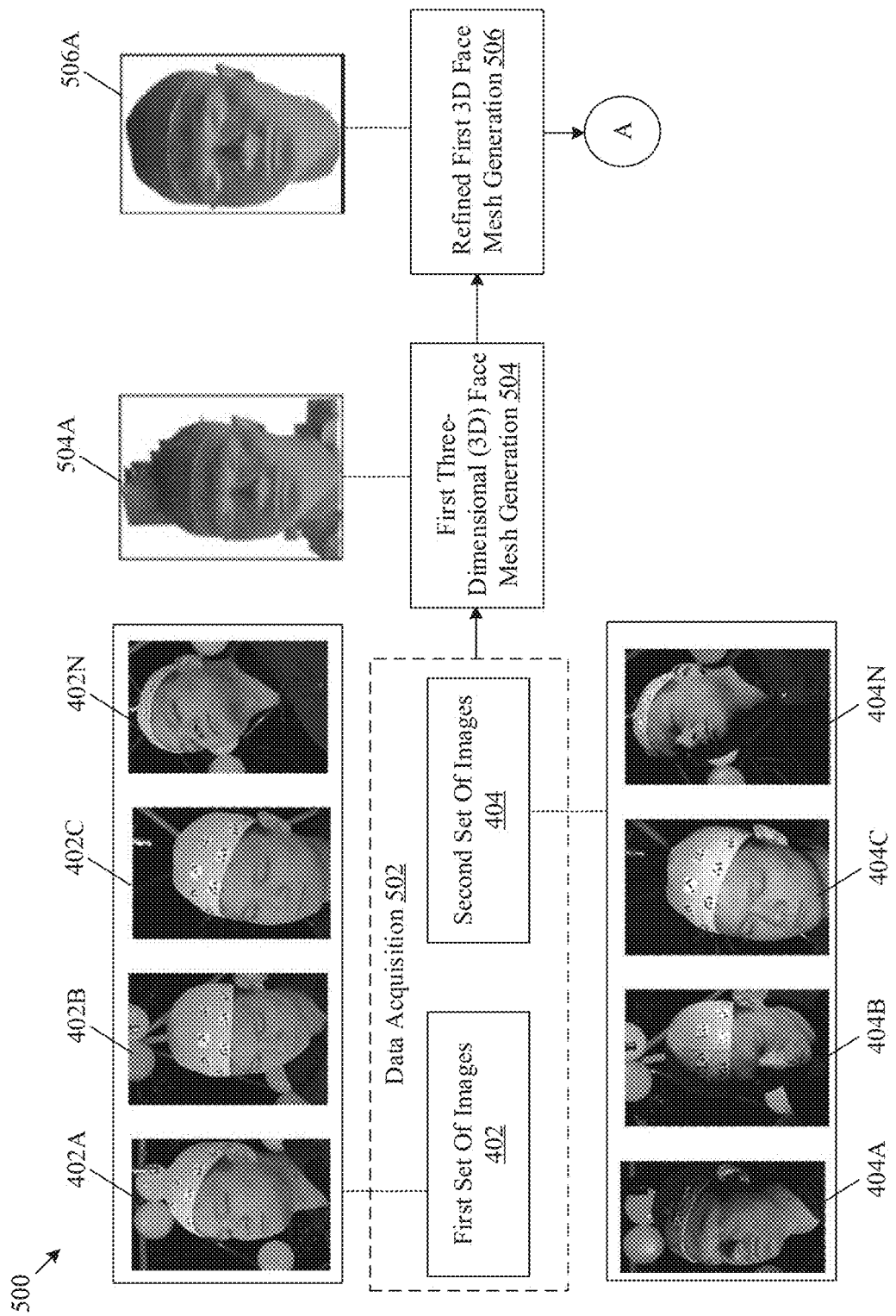
FIGS. 5A, 5B, 5C, and 5D collectively illustrate exemplary operations for 3D microgeometry and reflectance modeling, in accordance with an embodiment of the disclosure.
Figure 5B:
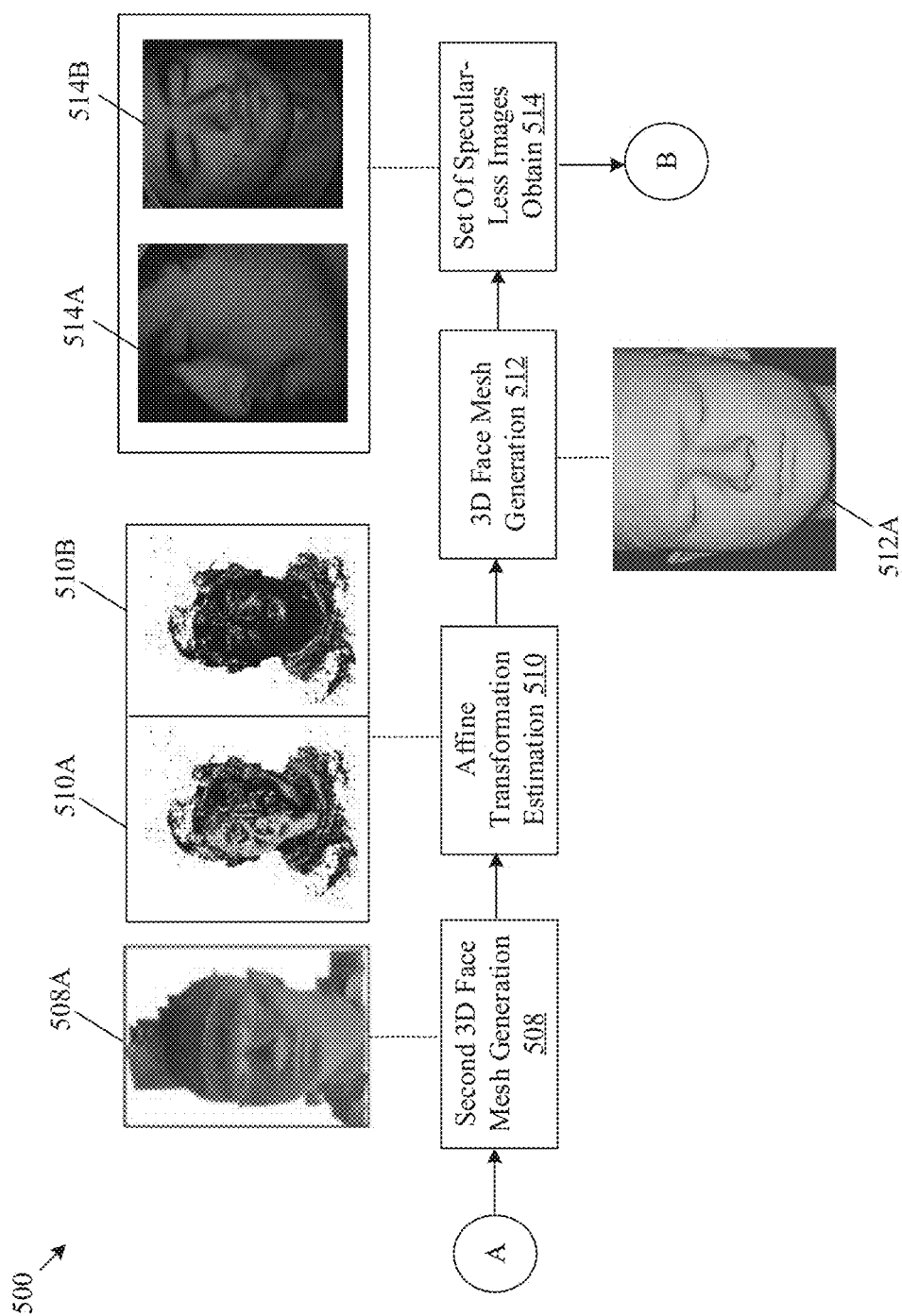

The system 102 may estimate an affine transformation between the refined first 3D face mesh and the generated second 3D face mesh. Thereafter, the system 102 may apply the estimated affine transformation on the refined first 3D face mesh to generate the 3D face mesh 118. The generated 3D face mesh may be rigid aligned with the generated second 3D face mesh and may be un-textured. Details of the generation of the 3D face mesh 118 are further provided for example, in FIGS. 5A and 5B.

Figure 5C:
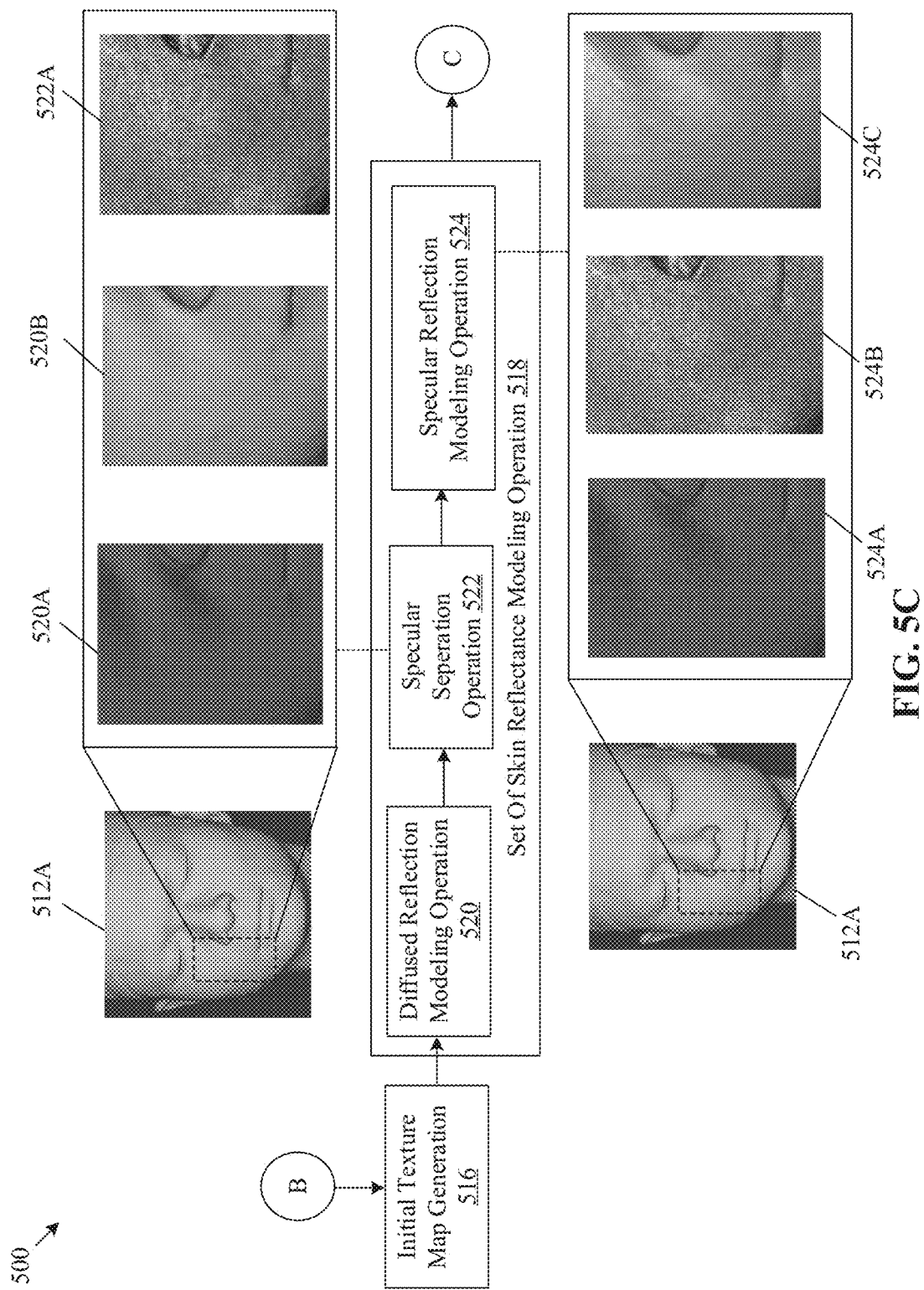
Figure 5D:
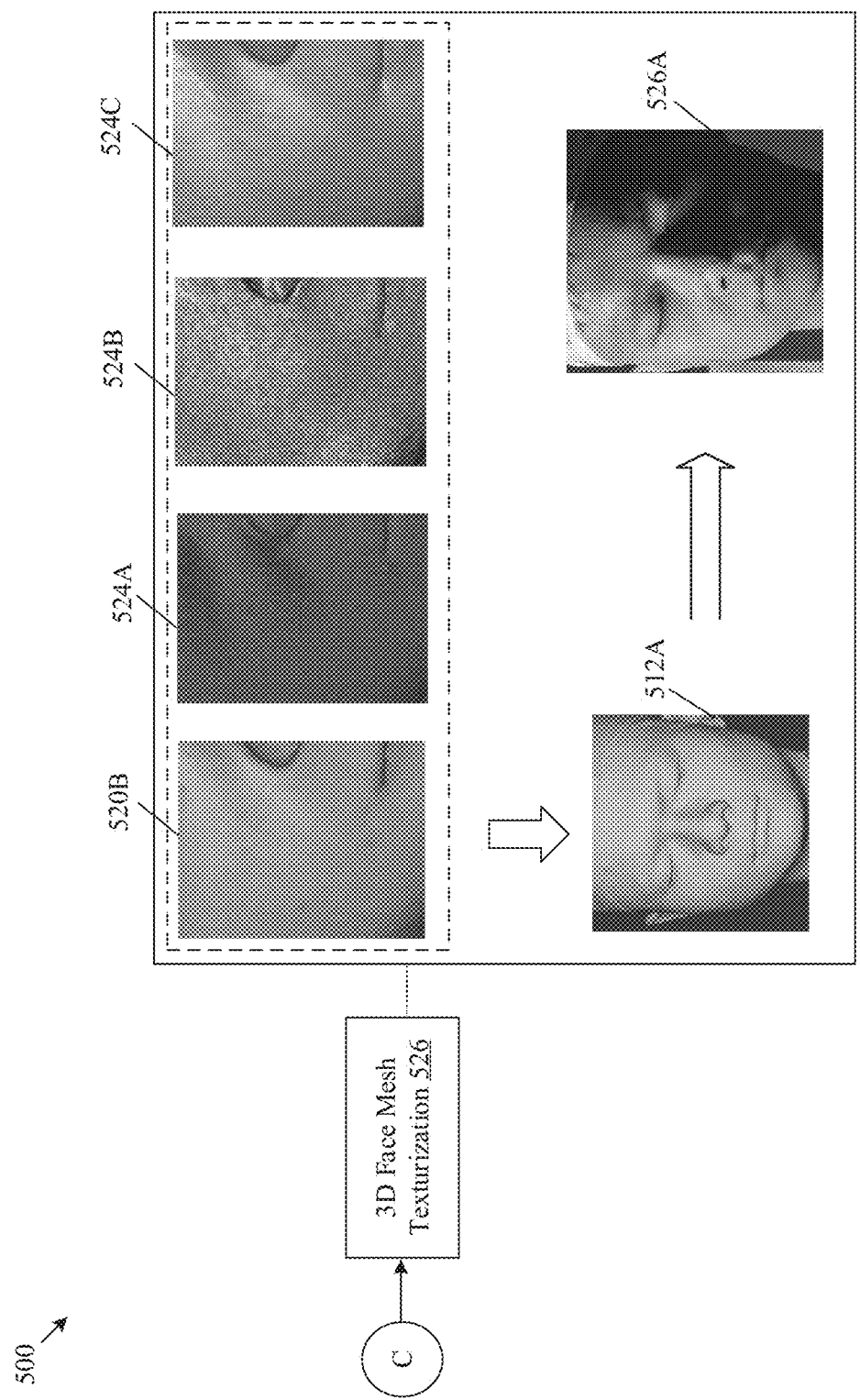

By using the generated 3D face mesh 118 and the second set of images 116, the system 102 may execute a set of skin-reflectance modeling operations to estimate a set of texture maps for the face 110. In accordance with an embodiment, the set of skin-reflectance modeling operations may include a diffused reflection modeling operation, a specular separation operation, and a specular reflection modeling operation. Details of the execution of the set of skin-reflectance modeling operations are provided for example, in FIGS. 5C and 5D.

The system 102 may texturize the generated 3D face mesh 118 based on the estimated set of texture maps. The texturization may include an operation in which texture information, including microgeometry skin details and skin reflectance details, of the estimated set of texture maps is mapped onto the generated 3D face mesh 118. Details of the texturization of the generated 3D face mesh 118 are further provided for example, in FIG. 5D.

Figure 2:
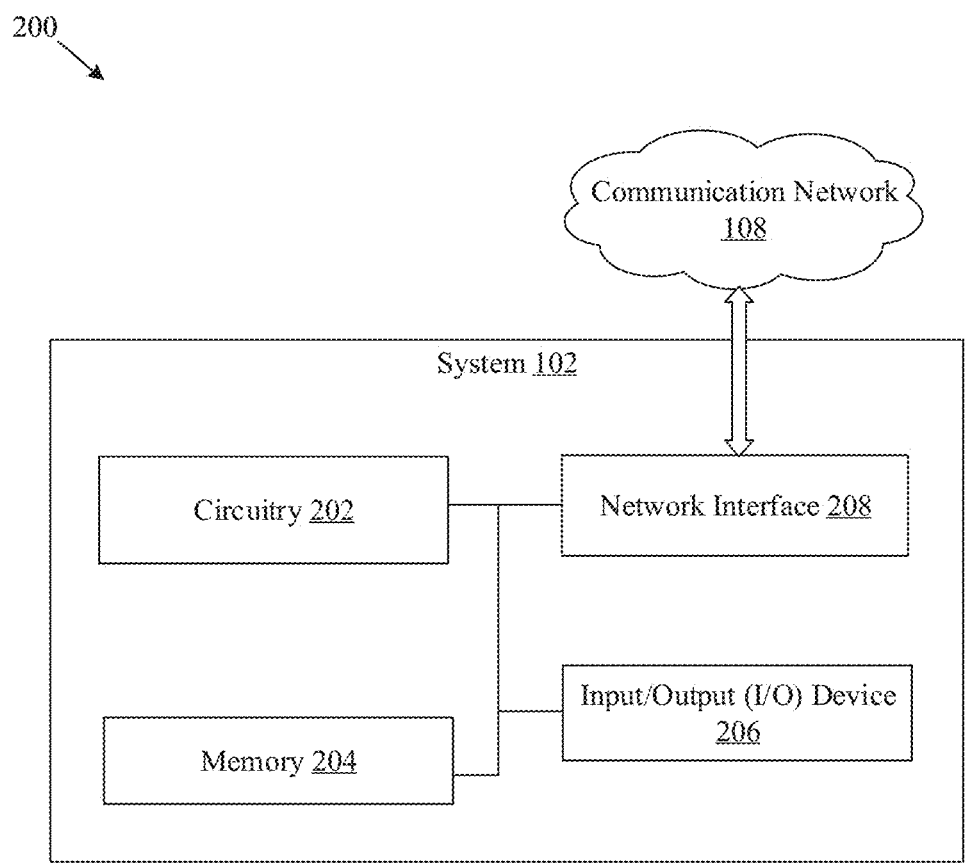
FIG. 2 is a block diagram that illustrates an exemplary system for 3D microgeometry and reflectance modeling, in accordance with an embodiment of the disclosure.

FIG. 2 is a block diagram that illustrates an exemplary system for 3D microgeometry and reflectance modeling, in accordance with an embodiment of the disclosure. FIG. 2 is explained in conjunction with elements from FIG. 1. With reference to FIG. 2, there is shown a block diagram 200 of the system 102. The system 102 may include circuitry 202, a memory 204, an Input/output (I/O) device 206, and a network interface 208. The circuitry 202 may be communicatively coupled to the memory 204, the I/O device 206, and the network interface 208.

The circuitry 202 may include suitable logic, circuitry, and interfaces that may be configured to execute program instructions associated with different operations to be executed by the system 102. The circuitry 202 may include one or more specialized processing units, each of which may be implemented as a separate processor. In an embodiment, the one or more specialized processing units may be implemented as an integrated processor or a cluster of processors that perform the functions of the one or more specialized processing units, collectively. The circuitry 202 may be implemented based on a number of processor technologies known in the art. Example implementations of the circuitry 202 may include, but are not limited to, an x86-based processor, x64-based processor, a Graphics Processing Unit (GPU), a Reduced Instruction Set Computing (RISC) processor, an Application-Specific Integrated Circuit (ASIC) processor, a co-processor (such as a Vision Processing Unit (VPU)), a Complex Instruction Set Computing (CISC) processor, a microcontroller, a central processing unit (CPU), and/or a combination thereof.

The memory 204 may include suitable logic, circuitry, and interfaces that may be configured to store the program instructions to be executed by the circuitry 202. The memory 204 may be configured to store the plurality of images 112 (which includes the first set of images 114 and the second set of images 116). The memory 204 may be also configured to store the generated 3D face mesh 118 and the estimated set of texture maps. Example implementations of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, and interfaces that may be configured to receive an input from a user and provide an output based on the received input. The I/O device 206 which may include various input and output devices, may be configured to communicate with the circuitry 202. For example, the system 102 may receive a user input, via the I/O device 206, to control the plurality of imaging devices 104 to capture the plurality of images 112. The I/O device 206, such as a display may render inputs and/or outputs, such as the generated 3D face mesh 118, the estimated set of texture maps, or the texturized 3D face mesh. Examples of the I/O device 206 may include, but are not limited to, a touch screen, a display device, a keyboard, a mouse, a joystick, a microphone, and a speaker.

The network interface 208 may include suitable logic, circuitry, and interfaces that may be configured to facilitate communication among the circuitry 202, the plurality of imaging devices 104, and the set of flash units 106, via the communication network 108. The network interface 208 may be implemented by use of various known technologies to support wired or wireless communication of the system 102 with the communication network 108. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 208 may be configured to enable wired or wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), 5G NR, code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The functions or operations executed by the system 102, as described in FIG. 1, may be performed by the circuitry 202. Operations executed by the circuitry 202 are described in detail, for example, in FIGS. 3, 4A, 4B, 5A, 5B, 5C, and 5D.

Figure 3:
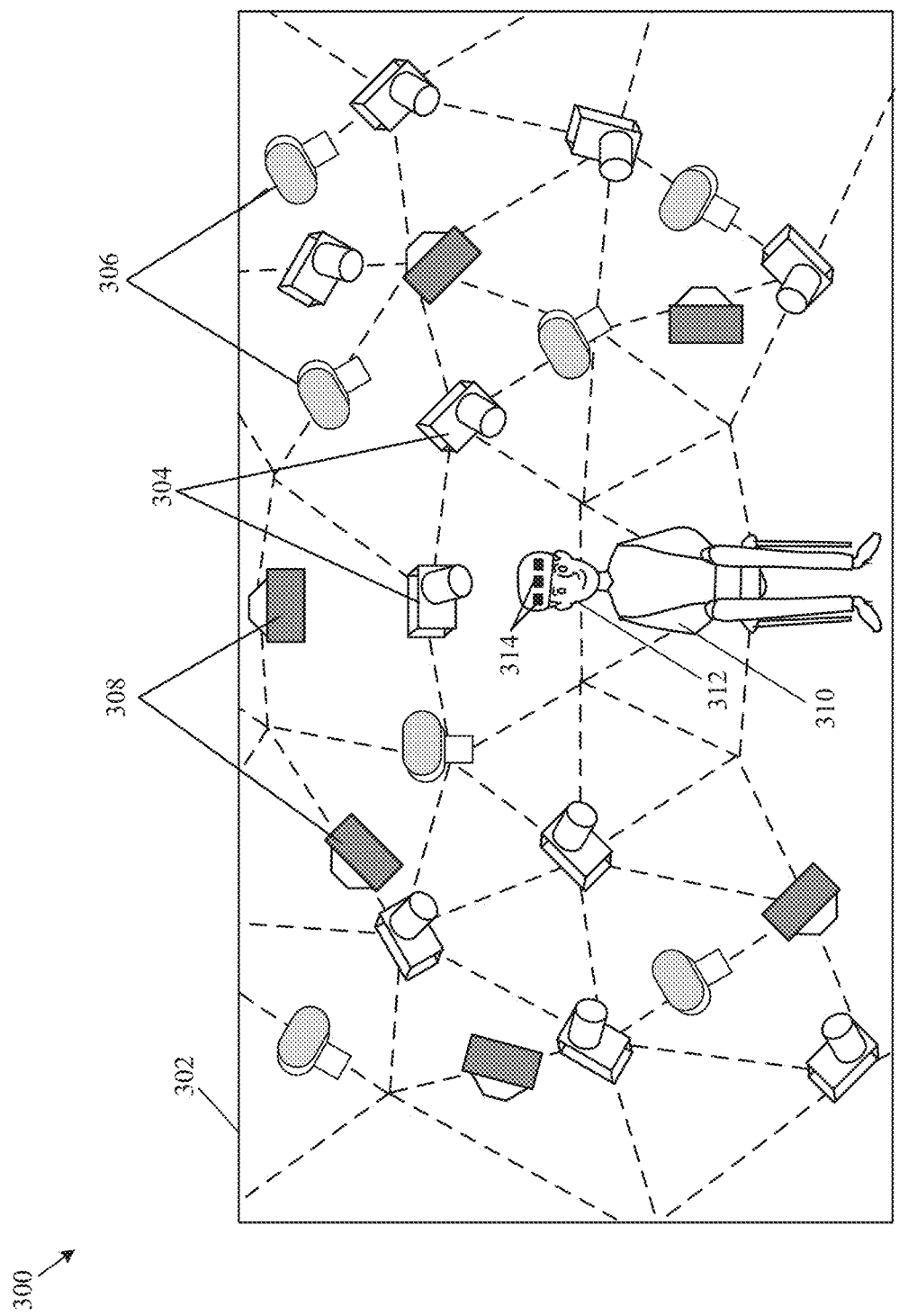
FIG. 3 illustrates an exemplary photogrammetry setup for 3D microgeometry and reflectance modeling, in accordance with an embodiment of the disclosure.

FIG. 3 is a diagram that illustrates an exemplary photogrammetry setup for 3D microgeometry and reflectance modeling, in accordance with an embodiment of the disclosure. FIG. 3 are explained in conjunction with elements from FIG. 1 and FIG. 2. With reference to FIG. 3, there is shown a diagram 300 which includes a 3D structure 302, a plurality of imaging devices 104, a set of flash units 306, and a set of diffusers 308. The diagram 300 shows a person 310 in a seated position inside the 3D structure 302.

The plurality of imaging devices 104 may be arranged (or mounted) at a corresponding first plurality of locations on the 3D structure 302. As shown, for example, the 3D structure 302 may be a dome-shaped lighting rig with enough space to include the person 310 or at least the face of the person 310. The plurality of flash units 306 and the set of diffusers 308 may be arranged or mounted at a corresponding second plurality of locations and a corresponding third plurality of locations, respectively, on the 3D structure 302. The arrangement of the plurality of imaging devices 104, the set of flash units 106, and the set of diffusers 308 on the 3D structure 302 may be such that each imaging device, flash unit and diffuser may be facing towards face 312 of the person 310 from a particular viewpoint. While an imaging device may acquire an image of the face 312 from a first viewpoint, the flash unit may illuminate the face 312 from a second viewpoint (which may be same as or different from the first viewpoint).

In the diagram 300, there is shown a set of coded targets 314 which are placed on the face 312 (such as on the forehead) of the person 310. In some instances, such coded targets 314 may include unique codes or identifiers, each of which may help to uniquely identify a location of a portion of the face 312 in each of the captured plurality of images 112. For example, when placed on the face 312, the set of coded targets 314 may appear at different angles to a number of imaging devices. If code value of a particular coded target is identified in multiple images from different viewpoints, then the location of the coded target in each image may be referenced to a common portion of the face 312.

The circuitry 202 may be configured to control the plurality of imaging devices 104 to capture the plurality of images 112 from a corresponding plurality of viewpoints. By way of example, and not limitation, the circuitry 202 may control the plurality of imaging devices 104 at a first time-instant to capture the first set of images 114 and The circuitry 202 may further control the plurality of imaging devices 104 at a second time-instant to capture the second set of images 116. Between the first time-instant and the second time-instant, there may be a time difference of about 1.5 seconds.

In an embodiment, the circuitry 202 may be configured to activate the set of flash units 106 concurrently while the plurality of imaging devices 104 captures the first set of images 114 at the first instance of time. The number of flash units in the set of flash units 106 may be less than or equal to the plurality of imaging devices 104. The concurrent activation of the set of flash units 106 may allow the lighting in the 3D structure 302 to be omni-directional. The omni-directional lighting may allow the face 312 of the person 310 to be illuminated evenly. The first set of images 114 may include the images of the face 312 of the person 310 exposed to the omni-directional lighting. The first set of images 114 may be utilized to generate an accurate 3D face mesh (such as the 3D face mesh 118) of the face 312 of the person 310.

In an embodiment, the circuitry 202 may further activate the set of flash units 106 in sequential pattern while the plurality of imaging devices 104 captures the second set of images 404 at the second time-instant. The sequential activation of the set of flash units 106 may allow the lighting in the 3D structure 302 to be directional. The directional lighting may partially illuminate the face 312 of the person 310 in each image. In accordance with an embodiment, a light intensity of the directional lighting may be greater than a light intensity of the omni-directional lighting. The light intensity of the omni-directional lighting may be reduced to decrease an amount of illumination on the face 312 of the person 310. The set of diffusers 308 may be utilized to soften the effect of lighting on the face 312 while the plurality of imaging devices 104 captures images of the face 312.

In some scenarios, each imaging device may have a delay associated therewith due to a difference between a time of the control (such as activation of a shutter) of the imaging device and a time of capturing of an image (of the plurality of images 112) by the imaging device. Such delay in time may be due to hardware limitation of the plurality of imaging devices 104. The circuitry 202 may activate each flash unit in the sequential pattern at a set interval to match the delay encountered by each imaging device. In an embodiment, the circuitry 202 may activate a first subset of flash units of the set of flash units 106 while a first group of imaging devices (of the plurality of imaging devices 104) captures one or more first images of the second set of images 116. The circuitry 202 may activate a second subset of flash units of the set of flash units 106 while a second group of imaging devices (of the plurality of imaging devices 104) captures one or more second images of second set of images 116. The second set of images 116 may be utilized to capture the microgeometry skin details and the skin reflectance details of the face 312 of the person 310.

Figure 4A:
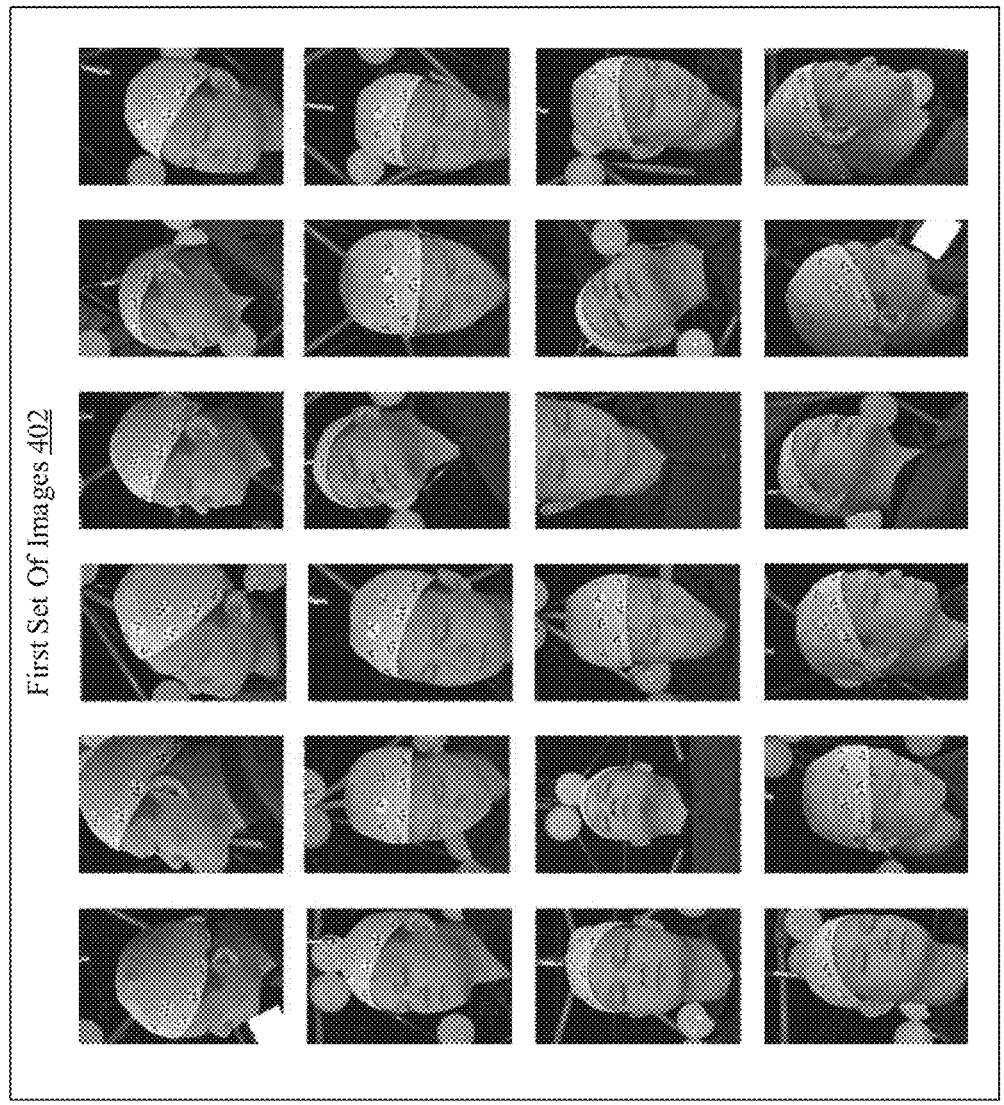
FIG. 4A illustrates example images captured under omni-directional lighting conditions, in accordance with an embodiment of the disclosure.

FIG. 4A illustrates example images captured under omni-directional lighting conditions, in accordance with an embodiment of the disclosure. FIG. 4A is explained in conjunction with elements from FIGS. 1, 2, and 3. With reference to FIG. 4A, there is shown a diagram 400A which includes a first set of images 402. The first set of images 402 may be generated by the plurality of imaging devices 304 at a first time-instant. The first set of images 402 may include the face 312 of the person 310 from a corresponding plurality of viewpoints. The face 312 in the first set of images 402 may be exposed to the omni-directional lighting. For example, a first image may include a left side view of the face 312, a second image may include a right side view of the face 312, and a third image may include a front view of the face 312. The number of images in the first set of images 402 may depend on the number imaging devices that may be controlled at the first time-instant to capture the first set of images 402. By way of example, and not limitation, the number of imaging devices may be 24 and the number of images in the first set of images 402 may be 24.

Figure 4B:
FIG. 4B illustrates example images captured under directional lighting conditions, in accordance with an embodiment of the disclosure.

FIG. 4B illustrates example images captured under directional lighting conditions, in accordance with an embodiment of the disclosure. FIG. 4B is explained in conjunction with elements from FIGS. 1, 2, 3, and 4A. With reference to FIG. 4B, there is shown a diagram 400B which includes a second set of images 404. The second set of images 404 may be output by the plurality of imaging devices 304 at the second time-instant. The second set of images 404 may include the face 312 of the person 310 from a corresponding plurality of viewpoints. The face 312 in the second set of images 404 may be exposed to the directional lighting. For example, a first image of may include a left side view of the face 312, a second image may include a right side view of the face 312, and a third image may include a front view of the face 312. The number of images in the second set of images 404 may be dependent on the number of imaging devices. For example, the number of imaging devices may be 24 and the number of images in the second set of images 404 may be 24.

FIGS. 5A, 5B, 5C, and 5D collectively illustrate exemplary operations for 3D microgeometry and reflectance modeling, in accordance with an embodiment of the disclosure. With reference to FIGS. 5A, 5B, 5C, and 5D, there is shown a block diagram 500 that illustrates exemplary operations from 502 to 526, as described herein. The exemplary operations illustrated in block diagram 500 may start at 502 and may be performed by any computing system, apparatus, or device, such as by system 102 of FIG. 1 or the circuitry 202 of FIG. 2. Although illustrated with discrete blocks, the exemplary operations associated with one or more blocks of the block diagram 500 may be divided into additional blocks, combined into fewer blocks, or eliminated, depending on implementation of the exemplary operations.

At 502, the plurality of images 112 may be received. In accordance with an embodiment, the circuitry 202 may be configured to receive the plurality of images 112 from the plurality of imaging devices 304. The plurality of images 112 may include the first set of images 402 and the second set of images 404. As shown, for example, the first set of images 402 may include a first image 402A, a second image 402B, a third image 402C, and an Nth image 402N. The second set of images 404 may include a first image 404A, a second image 404B, a third image 404C, and an Nth image 404N. The first set of images 402 and the second set of images 404 may include the face 312 of the person 310. While the face 312 in the first set of images 402 may be exposed to omni-directional lighting, the face 312 in the second set of images 404 may be exposed to the directional lighting.

At 504, a first 3D face mesh 504A may be generated, based on the received first set of images 402. In accordance with an embodiment, the circuitry 202 may be configured to generate the first 3D face mesh 504A, based on the received first set of images 402. For 3D reconstruction of a 3D face mesh from 2D images, there are many techniques which may be known to one ordinarily skilled in the art. For example, the first 3D face mesh 504A may be generated using a photogrammetry-based method (such as structure from motion (SfM)), a method which requires stereoscopic images, or a method which requires monocular cues (such as shape from shading (SfS), photometric stereo, or shape from texture (SfT)). Details of such techniques have been omitted from the disclosure for the sake of brevity.

In an embodiment, the first 3D face mesh 504A may be a raw 3D scan of the face 312 of the person 310 and may include artifacts, such as pointy edges (i.e. edges with large dihedral angles), spikes, or holes (large and small size). To refine the first 3D face mesh 504A, a set of model clean-up operations may be performed, as described herein.

At 506, a set of model clean-up operations may be applied on the generated first 3D face mesh 504A to obtain a refined first 3D face mesh 506A. In accordance with an embodiment, the circuitry 202 may be configured to apply the set of model clean-up operations on the generated first 3D face mesh 504A to obtain the refined first 3D face mesh 506A. In an embodiment, the set of model clean-up operations may include removal of unwanted regions from the first 3D face mesh 504A, filling small holes (such as vacant spaces) in the first 3D face mesh 504A, and removal of spikes from the first 3D face mesh 504A.

The unwanted regions, such as incorrect estimated polygons on the first 3D face mesh 504A (which may not be a part of the face 312 of the person 310) may be removed. In the first 3D face mesh 504A, there may be a few vacant spaces or holes (i.e. a sufficiently large space with no polygons) in the first 3D face mesh 504A. Such holes may affect the fidelity of the first 3D face mesh 504A. Therefore, such unwanted holes may be removed, for example, using a suitable prediction method that may rely on arrangement or geometry of nodes in proximity of the holes in the first 3D face mesh 504A. In some instances, incorrect estimation of depth at some locations may lead to generation of unwanted spikes on the first 3D face mesh 504A. The circuitry 202 may remove or smoothen such unwanted spikes on the first 3D face mesh 504A to obtain the refined first 3D face mesh 506A.

At 508, a second 3D face mesh 508A may be generated based on the received second set of images 404. In accordance with an embodiment, the circuitry 202 may be configured to generate the second 3D face mesh 508A based on the received second set of images 404. Similar to the first 3D face mesh 504A, the second 3D face mesh 508A may be generating using a photogrammetry-based method (such as structure from motion (SfM)), a method which requires stereoscopic images, or a method which requires monocular cues (such as shape from shading (SfS), photometric stereo, or shape from texture (SfT)). Details of such techniques have been omitted from the disclosure for the sake of brevity.

The second 3D face mesh 508A may be a raw 3D scan of the face 312 of the person 310 and may include one or more of the artifacts. In accordance with an embodiment, the second 3D face mesh 508A may further be refined. The circuitry 202 may refine the generated second 3D face mesh 508A based on application of the set of model clean-up operations (as described at 506) on the second 3D face mesh 508A.

At 510, an affine transformation may be estimated between the refined first 3D face mesh 506A and the generated second 3D face mesh 508A. The circuitry 202 may be configured to estimate the affine transformation between the refined first 3D face mesh 506A and the generated second 3D face mesh 508A. In accordance with an embodiment, the affine transformation may be estimated based on the set of coded targets 314. By way of example, and not limitation, the circuitry 202 may be configured to determine first locations of the set of coded targets 314 in the received first set of images 402. The circuitry 202 may further determine second locations of the set of coded targets 314 on the face 312 in the received second set of images 404.

The affine transformation may be estimated based on a comparison of the determined first locations and the determined second locations.

As both the refined first 3D face mesh 506A and the second 3D face mesh may not be rigid-aligned initially, the difference between corresponding nodes of the refined first 3D face mesh 506A and the second 3D face mesh 508A may be non-zero. The difference may be calculated using L1 or L2 norm, for example. As shown, for example, a heatmap 510A represents a node-wise difference between the refined first 3D face mesh 506A and the generated second 3D face mesh 508A. Points on the left half of the heatmap 510A represent a higher difference between corresponding nodes of the two meshes as compared to points on the right half of the heatmap 510A.

At 512, the estimated affine transformation may be applied on the refined first 3D face mesh 506A. In accordance with an embodiment, the circuitry 202 may be configured to apply the estimated affine transformation on the refined first 3D face mesh 506A to generate the 3D face mesh 512A. The generated 3D face mesh 512A may be rigid aligned with the generated second 3D face mesh 508A.

The affine transformation may include a matrix (or matrices) of rotation and translation values. The relative position and orientation of the refined first 3D face mesh 506A may be updated based on the matrix to match with that of the second 3D face mesh 508A. As shown, for example, a heatmap 510B represents a node-wise difference between the 3D face mesh 512A and the generated second 3D face mesh 508A. All the points on the face region of the heatmap 510B represent a near-zero difference between corresponding nodes of the 3D face mesh 512A and the generated second 3D face mesh 508A. Thus, the heatmap 510B indicates that both the 3D face mesh 512A and the generated second 3D face mesh 508A may be rigid aligned.

At 514, a white balancing operation may be applied on the second set of images 404 to generate a set of white-balanced images. Due to lighting variations, the color of the face 312 may vary slightly in different images of the second set of images 404. The white balancing operation may be applied to correct the skin color of the face 312 in all or some images of the second set of images 404. In accordance with an embodiment, the circuitry 202 may be configured to apply the white balancing operation on the second set of images 404 to generate the set of white-balanced images. Thereafter, the circuitry 202 may obtain a set of specular-less images (such as a first specular-less image 514A and a second specular-less image 514B) by removal of specular information from the set of white-balanced images. The removal of specular information may lead to removal of highlights from the face 312 of the person 310 in the set of white-balanced images. The specular information may be removed based on conversion of color information, within each image of the set of white-balanced images, from a red-green-blue (RGB) space to an SUV color space. The color information from the RGB space may be converted to the SUV color space by a rotation of RGB coordinate vectors of the RGB space.

At 516, a UV coordinate map of the face 312 may be determined based on the generated 3D face mesh 512A. In accordance with an embodiment, the circuitry 202 may be configured to determine a UV coordinate map of the face 312 based on the generated 3D face mesh 512A. The UV coordinate map of the face 312 may be a representation of the 3D face mesh 512A on a 2D UV coordinate space. Thereafter, the circuitry 202 may generate an initial texture map of the face 312 by texture-mapping the set of specular-less images (such as the first specular-less image 514A and the second specular-less image 514B) onto the determined UV coordinate map. The initial texture map of the face 312 may include texture information and color information from skin and/or other visible portions of the face 312 in the set of specular-less images. The initial texture map may be represented in UV coordinate space, where "U" and "V" may be 2D coordinates of texture values.

At 518, a set of skin-reflectance modeling operations may be executed. By using the generated 3D face mesh 512A and the second set of images 404, the circuitry 202 may execute the set of skin-reflectance modeling operations, as described herein. Such operations may be executed to estimate a set of texture maps for the face 312 of the person 310. In accordance with an embodiment, the set of skin-reflectance modeling operations may include a diffused reflection modeling operation, a specular separation operation, and a specular reflection modeling operation. The diffused reflection modeling operation may be executed to generate a diffuse normal map and a diffuse albedo map. The specular separation operation may be executed to generate a specular reflection information separation map. The specular reflection modeling operation may be executed to generate a specular albedo map, a specular normal map, and a roughness map of the face 312 of the person 310.

At 520, the diffused reflection modeling operation may be executed. In an embodiment, the circuitry 202 may be configured to execute the diffused reflection modeling operation on the second set of images 404. The diffused reflection modeling operation may be executed to generate a diffuse normal map 520A of the face 312, based on the initial texture map (obtained at 516) of the face 312. The diffused reflection modeling operation may be further executed to generate a diffuse albedo map 520B of the face 312 based on the initial texture map and the generated diffuse normal map 520A. The diffuse albedo map 520B may be referred to as a first texture map of the estimated set of texture maps (at 518, for example).

In an embodiment, the generation of the diffuse normal map 520A and the diffused albedo map may be based on a Lambertian light model. The Lambertian light model may be represented by equation (1), as follows:

$$L_I n \rho = \rho_i \quad (1)$$

where n is a diffuse normal, ρ is a diffuse albedo, and $L_I$ is a direction of light. The direction of light may be determined from a pre-defined position and orientation of each of the plurality of imaging devices 304.

At 522, the specular separation operation may be executed. In accordance with an embodiment, the circuitry 202 may be configured to execute the specular separation operation to separate specular reflection information from the second set of images 404. The specular reflection information may be separated based on the generated diffuse normal map 520A and the generated diffuse albedo map 520B. A map 522A which includes the separated specular reflection information is shown as an example.

At 524, the specular reflection modeling operation may be executed. In accordance with an embodiment, the circuitry 202 may be configured to execute the specular reflection modeling operation on the second set of images 404. The specular reflection modeling operation may be executed to generate a specular normal map 524A of the face 312, a specular albedo map 524B of the face 312, and a roughness map 524C of the face 312. The specular normal map 524A, the specular albedo map 524B, and the roughness map 524C may be generated based on the separated specular reflection information (and the second set of images 404). The specular normal map 524A may include the shine and highlight information of the face 312 in the second set of images 404. The specular albedo map 524B may include the color information of the face 312 and may exclude the highlight information and shadow information of the face 312 of the person 310. The roughness map 524C may represent a roughness of the skin of the face 312 of the person 310. The roughness map 524C may be represented as a black and white color texture image. The specular normal map 524A, the specular albedo map 524B, and the roughness map 524C may be referred to as second texture maps of the set of texture maps (estimated at 516). The first texture map and the second texture maps may include the microgeometry skin details and the skin reflectance details of the face 312 of the person 310.

In an embodiment, the generation of the specular normal map 524A, the specular albedo map 524B, and the roughness map 524C may be based on the Blinn-Phong light model. The Blinn-Phong light model may be represented by equation (2), as follows:

$$\rho\left(f_i \frac{\alpha+8}{8}\right)(h_i n)^\alpha = \rho_i \qquad (2)$$

where n is a specular normal, ρ is a specular albedo, and α relates to a surface roughness.

At 526, the generated 3D face mesh 512A may be texturized. In accordance with an embodiment, the circuitry 202 may be configured to texturize the generated 3D face mesh 512A based on the estimated set of texture maps. The texturization may include an operation in which texture information, including microgeometry skin details and skin reflectance details, of the estimated set of texture maps is mapped onto the generated 3D face mesh 512A. In accordance with an embodiment, the estimated set of texture maps may include the diffuse albedo map 520B of the face 312, the specular normal map 524A of the face 312, the specular albedo map 524B of the face 312, and the roughness map 524C of the face 312. The microgeometry skin details may include texture information for various skin components, such as pores, ridges, freckles, and furrows. Similarly, the skin reflectance details may include information for a diffused reflection component, a specular reflection component, an albedo component, and a roughness component. The texturized 3D face model 526A may include both the microgeometry skin details and the skin reflectance details. Therefore, the texturized 3D face model 526A may be treated as a high fidelity 3D model of the face 312 of the person 310.

Although the block diagram 500 is illustrated as discrete operations, such as 502, 504, 506, 508, 510, 512, 514, 516, 518, 520, 522, 524, and 526, the disclosure is not so limited. Accordingly, in certain embodiments, such discrete operations may be further divided into additional operations, combined into fewer operations, or eliminated, depending on the particular implementation without detracting from the essence of the disclosed embodiments.

Figure 6:
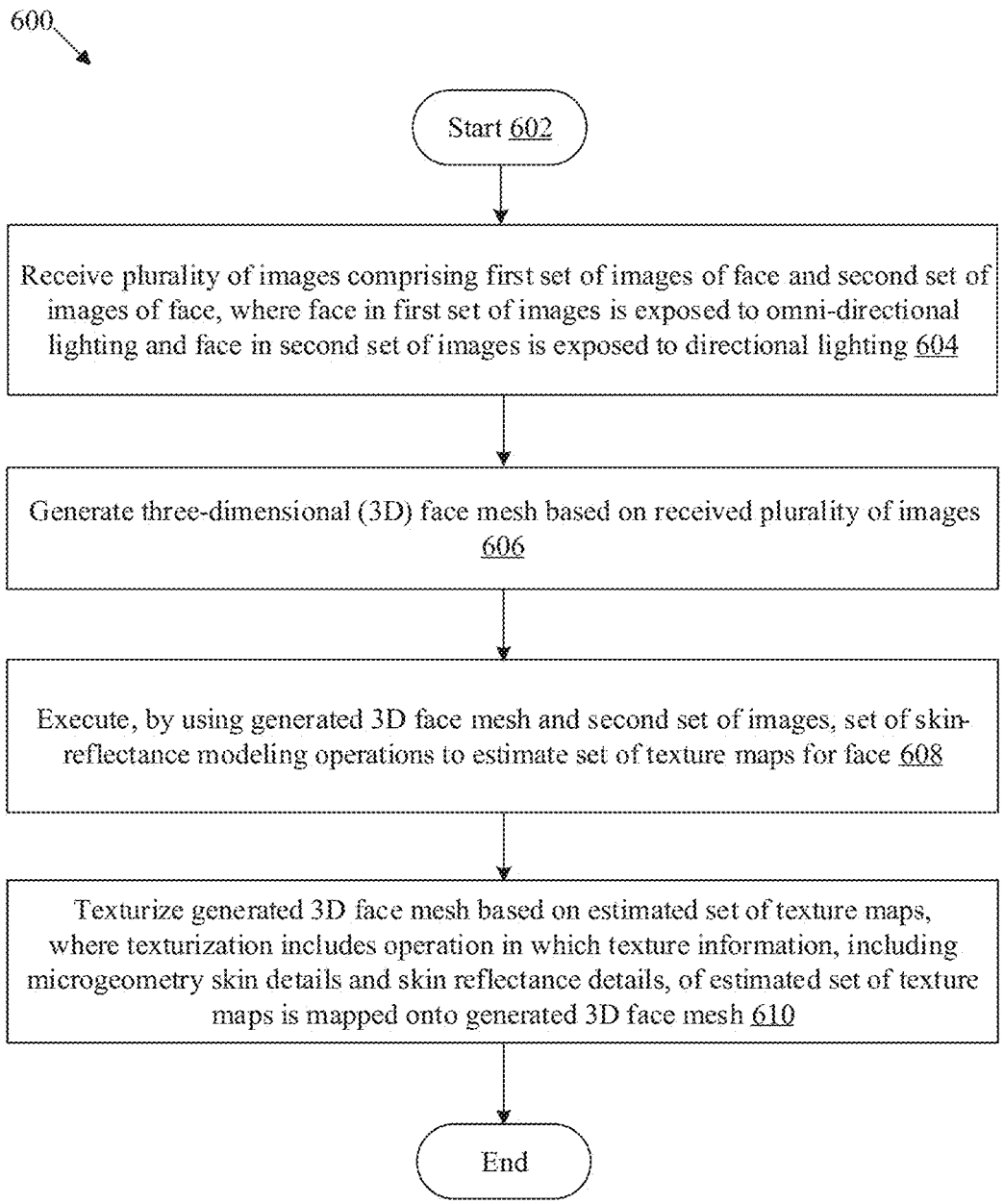
FIG. 6 is a flowchart that illustrates an exemplary method for 3D microgeometry and reflectance modeling, in accordance with an embodiment of the disclosure.

FIG. 6 is a flowchart that illustrates an exemplary method 3D microgeometry and reflectance modeling, in accordance with an embodiment of the disclosure. FIG. 6 is explained in conjunction with elements from FIGS. 1, 2, 3, 4A, 4B, 5A, 5B, 5C, and 5D. With reference to FIG. 6, there is shown a flowchart 600. The method illustrated in the flowchart 600 may be executed by any computing system, such as by the system 102 or the circuitry 202. The method may start at 602 and proceed to 604.

At 604, the plurality of images 112 that may include the first set of images 402 of the face 312 and the second set of images 404 of the face 312 may be received. In accordance with an embodiment, the circuitry 202 may be configured to receive the plurality of images 112 that may include the first set of images 402 of the face 312 and the second set of images 404 of the face 312 of the person 310. The face 312 in the first set of images 402 may be exposed to the omni-directional lighting and the face 312 in the second set of images 404 may be exposed to the directional lighting. Details of the reception of the plurality of images 112 are further provided for example, in FIG. 3.

At 606, the 3D face mesh 512A may be generated based on the received plurality of images 112. In accordance with an embodiment, the circuitry 202 may be configured to generate the 3D face mesh 512A based on the received plurality of images 112. Details of the generation of the 3D face mesh 512A are further provided for example, in FIG. 5A.

At 608, a set of skin-reflectance modeling operations may be executed, by using the generated 3D face mesh 512A and the second set of images 404, to estimate the set of texture maps for the face 312. In accordance with an embodiment, the circuitry 202 may be configured to execute the set of skin-reflectance modeling operations, by using the generated 3D face mesh 512A and the second set of images 404, to estimate the set of texture maps for the face 312. Details of the execution of the set of skin-reflectance modeling operations are provided, for example, in FIGS. 5C and 5D.

At 610, the generated 3D face mesh 512A may be texturized based on the estimated set of texture maps. In accordance with an embodiment, the circuitry 202 may be configured to texturize the generated 3D face mesh 512A based on the estimated set of texture maps. The texturization may include an operation in which texture information, including microgeometry skin details and skin reflectance details, of the estimated set of texture maps is mapped onto the generated 3D face mesh 512A. Details of the texturization of the 3D face mesh 512A are further provided for example, in FIG. 5D. Control may pass to end.

Although the flowchart 600 is illustrated as discrete operations, such as 602, 604, 606, 608 and 610, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer-readable medium and/or storage medium having stored thereon, instructions executable by a machine and/or a computer to operate a system (such as the system 102). The instructions may cause the machine and/or computer to perform operations that may include receiving a plurality of images (such as the plurality of images 112) which may include a first set of images (such as the first set of images 114) of a face (such as the face 110) and a second set of images (such as the second set of images 116) of the face 110. The face 110 in the first set of images 114 may be exposed to omni-directional lighting and the face 110 in the second set of images 116 may be exposed to directional lighting. The operations may further include generating a three-dimensional (3D) face mesh (such as the 3D face mesh 118) based on the received plurality of images 112. The operations may further include executing, by using the generated 3D face mesh 118 and the second set of images 116, a set of skin-reflectance modeling operations to estimate a set of texture maps for the face 110. The operations may further include texturizing the generated 3D face mesh 118 based on the estimated set of texture maps. The texturization may include an operation in which texture information, including microgeometry skin details and skin reflectance details, of the estimated set of texture maps is mapped onto the generated 3D face mesh 118.

Exemplary aspects of the disclosure may provide a system (such as the system 102 of FIG. 1) that includes circuitry (such as the circuitry 202). The circuitry 202 may be configured to receive a plurality of images (such as the plurality of images 112) which may include a first set of images (such as the first set of images 114) of a face (such as the face 110) and a second set of images (such as the second set of images 116) of the face 110. The face 110 in the first set of images 114 may be exposed to omni-directional lighting and the face 110 in the second set of images 116 may be exposed to directional lighting. The circuitry 202 may be further configured to generate a three-dimensional (3D) face mesh (such as the 3D face mesh 118) based on the received plurality of images 112. The circuitry 202 may be further configured to execute, by using the generated 3D face mesh 118 and the second set of images 116, a set of skin-reflectance modeling operations to estimate a set of texture maps for the face 110. The circuitry 202 may be further configured to texturize the generated 3D face mesh 118 based on the estimated set of texture maps. The texturization may include an operation in which texture information, including microgeometry skin details and skin reflectance details, of the estimated set of texture maps is mapped onto the generated 3D face mesh 118.

In accordance with an embodiment, the system 102 may further include a plurality of imaging devices (such as the plurality of imaging devices 304) arranged at a corresponding first plurality of locations on a 3D structure (such as the 3D structure 302). The circuitry 202 may be further configured to control the plurality of imaging devices 304 to capture the plurality of images 112 from a corresponding plurality of viewpoints.

In accordance with an embodiment, the system 102 may further include a set of flash units (such as the set of flash units 306) arranged at a corresponding second plurality of locations on the 3D structure 302. The circuitry 202 may be further configured to activate the set of flash units 306 concurrently while the plurality of imaging devices 304 captures the first set of images 402. The circuitry 202 may activate the set of flash units 306 in sequential pattern while the plurality of imaging devices 304 captures the second set of images 404.

In accordance with an embodiment, the light intensity of the directional lighting may be greater than a light intensity of the omni-directional lighting.

In accordance with an embodiment, the circuitry 202 may be further configured to generate a first 3D face mesh (such as the first 3D face mesh 504A), based on the received first set of images 402. The circuitry 202 may apply a set of model clean-up operations on the generated first 3D face mesh 504A to obtain a refined first 3D face mesh (such as the refined first 3D face mesh 506A). The circuitry 202 may further generate a second 3D face mesh (such as the second 3D face mesh 508A) based on the received second set of images 404. The circuitry 202 may estimate an affine transformation between the refined first 3D face mesh 506A and the generated second 3D face mesh 508A. The circuitry 202 may further apply the estimated affine transformation on the refined first 3D face mesh 506A to generate the 3D face mesh 512A. The generated 3D face mesh 512A may be rigid aligned with the generated second 3D face mesh 508A.

In accordance with an embodiment, the circuitry 202 may be further configured to determine first locations of a set of coded targets (such as the set of coded targets 314) on the face 312 in the received first set of images 402. The circuitry 202 may determine second locations of the set of coded targets 314 on the face 312 $e$ in the received second set of images 404. The circuitry 202 may further estimate the affine transformation based on comparison of the determined first locations and the determined second locations.

In accordance with an embodiment, the circuitry 202 may be further configured to apply a white balancing operation on the second set of images 404 to generate a set of white-balanced images. The circuitry 202 may obtain a set of specular-less images (such as the first specular-less image 514A and the second specular-less image 514B) by removal of specular information from the set of white-balanced images. The specular information may be removed based on conversion of color information, within each image in the received second set of images 404, from a red-green-blue (RGB) space to an SUV color space.

In accordance with an embodiment, the circuitry 202 may be further configured to determine a UV coordinate map of the face 312 based on the generated 3D face mesh 512A. The circuitry 202 may further generate an initial texture map of the face 312 by texture-mapping the set of specular-less images onto the determined UV coordinate map.

In accordance with an embodiment, the set of skin-reflectance modeling operations may include a diffused reflection modeling operation, a specular separation operation, and a specular reflection modeling operation.

In accordance with an embodiment, the circuitry 202 may be further configured to execute the diffused reflection modeling operation to generate a diffuse normal map (such as the diffuse normal map 520A) of the face 312 based on the initial texture map. The circuitry 202 may further generate a diffuse albedo map (such as the diffuse albedo map 520B) of the face 312 based on the initial texture map and the generated diffuse normal map 520A. The diffuse albedo map 520B may be a first texture map of the estimated set of texture maps.

In accordance with an embodiment, the circuitry 202 may be further configured to execute the specular separation operation to separate specular reflection information from the second set of images 404, based on the generated diffuse normal map 520A and the generated diffuse albedo map 520B.

In accordance with an embodiment, the circuitry 202 may be further configured to execute the specular reflection modeling operation to generate, based on the separated specular reflection information, a specular albedo map (such as the specular albedo map 524B) of the face 312, a specular normal map (such as the specular normal map 524A) of the face 312, and a roughness map (such as the roughness map 524C) of the face 312. The specular albedo map 524B, the specular normal map 524A, and the roughness map 524C may be second texture maps of the estimated set of texture maps.

In accordance with an embodiment, the estimated set of texture maps may include the diffuse albedo map 520B of the face 312, the specular albedo map 524B of the face 312, the specular normal map 524A of the face 312, and the roughness map 524C of the face 312.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. A system, comprising:
a plurality of imaging devices at a corresponding first plurality of locations on a three-dimensional (3D) structure;
a set of flash units at a corresponding second plurality of locations on the 3D structure; and
circuitry configured to:
control the plurality of imaging devices to capture a plurality of images from a corresponding plurality of viewpoints, wherein the plurality of images includes a first set of images of a face and a second set of images of the face;
activate the set of flash units concurrently while the plurality of imaging devices captures the first set of images of the face;
activate the set of flash units in a sequential pattern while the plurality of imaging devices captures the second set of images of the face;
receive, from the plurality of imaging devices, the plurality of images comprising the first set of images of the face and the second set of images of the face, wherein
the face in the first set of images is exposed to omni-directional lighting and the face in the second set of images is exposed to directional lighting, and
a light intensity of the directional lighting is greater than a light intensity of the omni-directional lighting;
generate a 3D face mesh based on the received plurality of images;
execute, by using the generated 3D face mesh and the second set of images, a set of skin-reflectance modeling operations to estimate a set of texture maps for the face; and
texturize the generated 3D face mesh based on the estimated set of texture maps, wherein the texturization comprises an operation in which texture information, including microgeometry skin details and skin reflectance details, of the estimated set of texture maps is mapped onto the generated 3D face mesh.

2. The system according to claim 1, wherein the circuitry is further configured to:
generate a first 3D face mesh, based on the received first set of images;
apply a set of model clean-up operations on the generated first 3D face mesh to obtain a refined first 3D face mesh;
generate a second 3D face mesh based on the received second set of images;
estimate an affine transformation between the refined first 3D face mesh and the generated second 3D face mesh; and
apply the estimated affine transformation on the refined first 3D face mesh to generate the 3D face mesh, wherein the generated 3D face mesh is rigid aligned with the generated second 3D face mesh.

3. The system according to claim 2, wherein the circuitry is further configured to:
determine first locations of a set of coded targets on the face in the received first set of images;
determine second locations of the set of coded targets on the face in the received second set of images; and
estimate the affine transformation based on comparison of the determined first locations and the determined second locations.

4. The system according to claim 1, wherein the circuitry is further configured to:
apply a white balancing operation on the second set of images to generate a set of white-balanced images; and
obtain a set of specular-less images by removal of specular information from the set of white-balanced images, wherein the specular information is removed based on conversion of color information, within each image in the received second set of images, from a red-green-blue (RGB) space to an SUV color space.

5. The system according to claim 4, wherein the circuitry is further configured to:
determine a UV coordinate map of the face based on the generated 3D face mesh; and
generate an initial texture map of the face by texture-mapping the set of specular-less images onto the determined UV coordinate map.

6. The system according to claim 5, wherein the set of skin-reflectance modeling operations comprises a diffused reflection modeling operation, a specular separation operation, and a specular reflection modeling operation.

7. The system according to claim 6, wherein the circuitry is configured to execute the diffused reflection modeling operation to:
generate a diffuse normal map of the face based on the initial texture map; and
generate a diffuse albedo map of the face based on the initial texture map and the generated diffuse normal map, wherein the diffuse albedo map is a first texture map of the estimated set of texture maps.

8. The system according to claim 7, wherein the circuitry is configured to execute the specular separation operation to separate specular reflection information from the second set of images, based on the generated diffuse normal map and the generated diffuse albedo map.

9. The system according to claim 8, wherein
the circuitry is configured to execute the specular reflection modeling operation to generate, based on the separated specular reflection information, a specular albedo map of the face, a specular normal map of the face, and a roughness map of the face, and
the specular albedo map, the specular normal map, and the roughness map are second texture maps of the estimated set of texture maps.

10. The system according to claim 1, wherein the estimated set of texture maps comprises a diffuse albedo map of the face, a specular albedo map of the face, a specular normal map of the face, and a roughness map of the face.

11. A method, comprising:
controlling a plurality of imaging devices arranged at a corresponding first plurality of locations on a three-dimensional (3D) structure, to capture a plurality of images from a corresponding plurality of viewpoints, wherein the plurality of images includes a first set of images of a face and a second set of images of the face;
activating a set of flash units arranged at a corresponding second plurality of locations on the 3D structure, concurrently while the plurality of imaging devices captures the first set of images of the face;
activating the set of flash units in a sequential pattern while the plurality of imaging devices captures the second set of images of the face;
receiving, from the plurality of imaging devices, the plurality of images comprising the first set of images of the face and the second set of images of the face, wherein
the face in the first set of images is exposed to omni-directional lighting and the face in the second set of images is exposed to directional lighting, and
a light intensity of the directional lighting is greater than a light intensity of the omni-directional lighting;
generating a 3D face mesh based on the received plurality of images;
executing, by using the generated 3D face mesh and the second set of images, a set of skin-reflectance modeling operations to estimate a set of texture maps for the face; and
texturizing the generated 3D face mesh based on the estimated set of texture maps, wherein the texturization comprises an operation in which texture information, including microgeometry skin details and skin reflectance details, of the estimated set of texture maps is mapped onto the generated 3D face mesh.

12. The method according to claim 11, further comprising:
generating a first 3D face mesh, based on the received first set of images;
applying a set of model clean-up operations on the generated first 3D face mesh to obtain a refined first 3D face mesh;
generating a second 3D face mesh based on the received second set of images;
estimating an affine transformation between the refined first 3D face mesh and the generated second 3D face mesh; and
applying the estimated affine transformation on the refined first 3D face mesh to generate the 3D face mesh, wherein the generated 3D face mesh is rigid aligned with the generated second 3D face mesh.

13. The method according to claim 12, further comprising:
determining first locations of a set of coded targets on the face in the received first set of images;
determining second locations of the set of coded targets on the face in the received second set of images; and
estimating the affine transformation based on comparison of the determined first locations and the determined second locations.

14. The method according to according to claim 11, wherein the estimated set of texture maps comprises a diffuse albedo map of the face, a specular albedo map of the face, a specular normal map of the face, and a roughness map of the face.

15. A non-transitory computer-readable medium having stored thereon, computer-executable instructions that when executed by a system, causes the system to execute operations, the operations comprising:
controlling a plurality of imaging devices arranged at a corresponding first plurality of locations on a three-dimensional (3D) structure, to capture a plurality of images from a corresponding plurality of viewpoints, wherein the plurality of images includes a first set of images of a face and a second set of images of the face;
activating a set of flash units arranged at a corresponding second plurality of locations on the 3D structure, concurrently while the plurality of imaging devices captures the first set of images of the face;
activating the set of flash units in a sequential pattern while the plurality of imaging devices captures the second set of images of the face;
receiving, from the plurality of imaging devices, the plurality of images comprising the first set of images of the face and the second set of images of the face, wherein
the face in the first set of images is exposed to omni-directional lighting and the face in the second set of images is exposed to directional lighting, and
a light intensity of the directional lighting is greater than a light intensity of the omni-directional lighting;
generating a 3D face mesh based on the received plurality of images;
executing, by using the generated 3D face mesh and the second set of images, a set of skin-reflectance modeling operations to estimate a set of texture maps for the face; and
texturizing the generated 3D face mesh based on the estimated set of texture maps, wherein the texturization comprises an operation in which texture information, including microgeometry skin details and skin reflectance details, of the estimated set of texture maps is mapped onto the generated 3D face mesh.

* * * * *